Feb. 12, 1952 H. C. VAISEY ET AL 2,585,603

ADJUSTABLE TIE HOLDER

Filed May 5, 1947 7 Sheets-Sheet 1

Inventors
Harold C. Vaisey
William H. Meeker.
By Shoemaker & Mattare
Attorneys

Feb. 12, 1952 H. C. VAISEY ET AL 2,585,603

ADJUSTABLE TIE HOLDER

Filed May 5, 1947 7 Sheets-Sheet 2

Inventors

Harold C. Vaisey

William H. Meeker

By Shoemaker & Mattare

Attorneys

ADJUSTABLE TIE HOLDER

Filed May 5, 1947 7 Sheets-Sheet 3

Inventors
Harold C. Vaisey
William H. Meeker
By Shoemaker & Mattare
Attorneys

Feb. 12, 1952 H. C. VAISEY ET AL 2,585,603

ADJUSTABLE TIE HOLDER

Filed May 5, 1947 7 Sheets-Sheet 4

Inventors

Harold C. Vaisey

William H. Meeker

By Shoemaker & Mattare

Attorneys

Feb. 12, 1952 H. C. VAISEY ET AL 2,585,603

ADJUSTABLE TIE HOLDER

Filed May 5, 1947 7 Sheets-Sheet 5

Inventors

Harold C. Vaisey

William H. Meeker

By Shoemaker & Mattare

Attorneys

ADJUSTABLE TIE HOLDER

Inventors
Harold C. Vaisey
William H. Meeker
By Shoemaker & Mattare
Attorneys

Feb. 12, 1952 H. C. VAISEY ET AL 2,585,603
ADJUSTABLE TIE HOLDER
Filed May 5, 1947 7 Sheets-Sheet 7
FIG. 33.
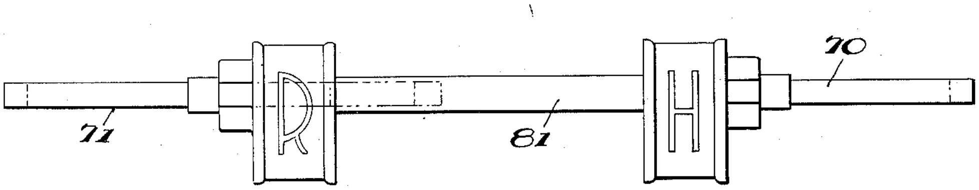
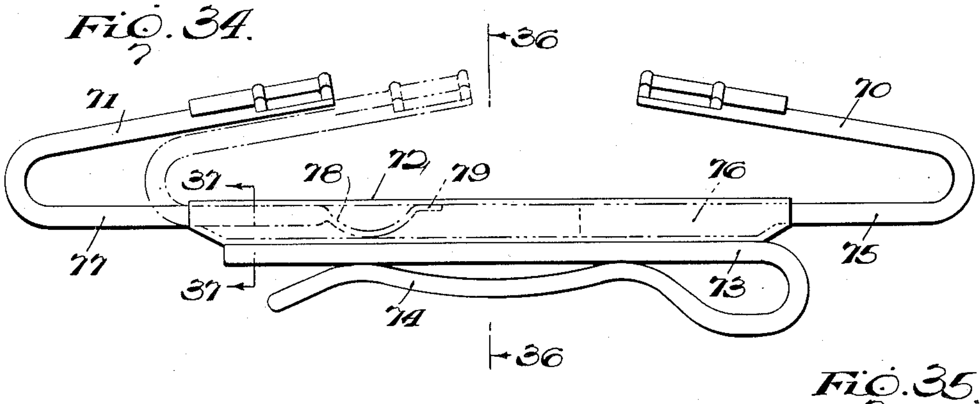
FIG. 35.
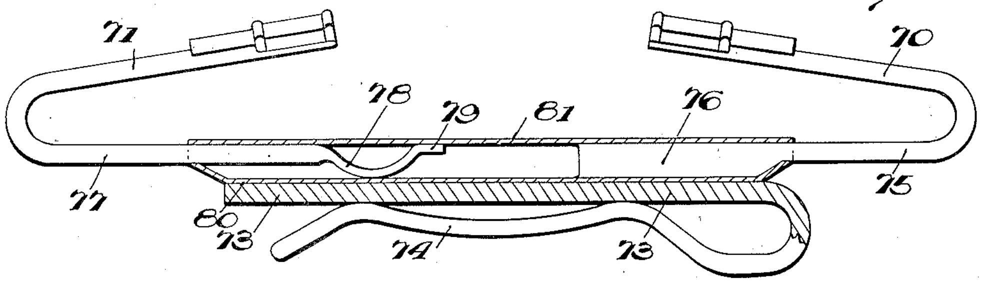
FIG. 36.
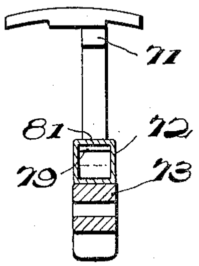
FIG. 37.
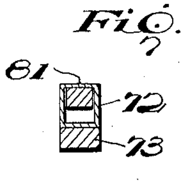
Inventor
Harold C. Vaisey
William H. Meeker
By Shoemaker & Mattare
Attorneys Patented Feb. 12, 1952 2,585,603

UNITED STATES PATENT OFFICE 2,585,603

ADJUSTABLE TIE HOLDER

Harold C. Vaisey and William H. Meeker, Rochester, N. Y., assignors to Hickok Manufacturing Company, Inc., Rochester, N. Y., a corporation of New York Application May 5, 1947, Serial No. 745,946

8 Claims. (Cl. 24—49)

This invention relates to improvements in tie holders and more particularly to devices of this kind that have tie holding means which is adjustable to accommodate ties of various widths.

An object of the invention is to provide an improved tie holder of the general type referred to of simple, compact construction that will be efficient in use, and in which the tie holding means can be easily adjusted and will be securely maintained in adjusted position.

Another object of the invention is to provide efficient adjustment means of simple, compact construction.

A further object of the invention is to provide an improved construction of mounting for the adjustable tie holding means that will provide a firm rigid support for the same in neat appearing compact form.

A still further object of the invention is to provide an improved mounting for the adjustable tie holding means of simple construction, easily manufactured and assembled, and that will be strong and serviceable in use.

An important novel feature of the invention resides in the special adjustment means provided that permits of readily adjusting the tie holding means and by which the same will be securely maintained in adjusted position.

Another important novel characteristic of the invention lies in the special form of mounting provided that provides a firm support for the adjustable tie holding means, forms an enclosing casing for the adjustment means, facilitates assembly of the parts and which is of relatively small size in cross section, and presents a slender ornamental appearance.

The invention, with other objects, novel features and advantages thereof will be understood from the following detailed description when considered in connection with the accompanying drawings forming part hereof and illustrating several embodiments of the invention.

In the drawings:

Fig. 33 is a front elevation of another modified form of the device;

Fig. 34 is a top plan view of the construction illustrated in Fig. 33;

Fig. 35 is a top plan view, with parts shown in section, of the construction illustrated in Fig. 33;

Fig. 36 is a transverse section on the line 36—36 of Fig. 34;

Fig. 37 is a transverse section on the line 37—37 of Fig. 34.

Figure 1:
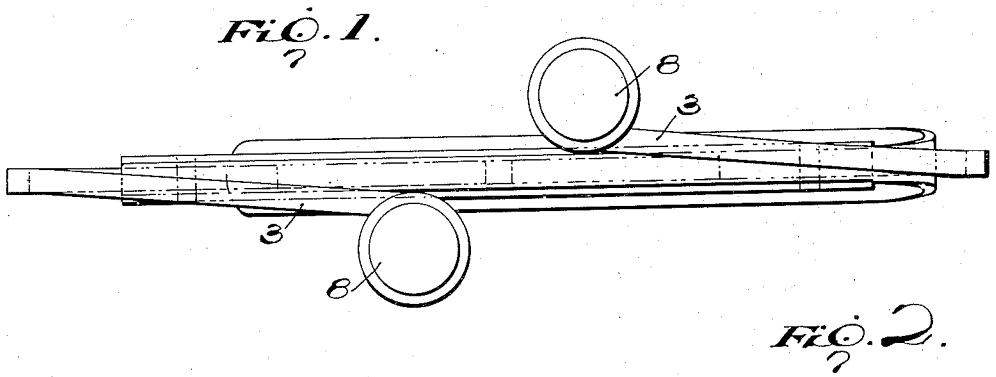
Fig. 1 is a front elevation of a tie holder constructed in accordance with the present invention.
Figure 2:
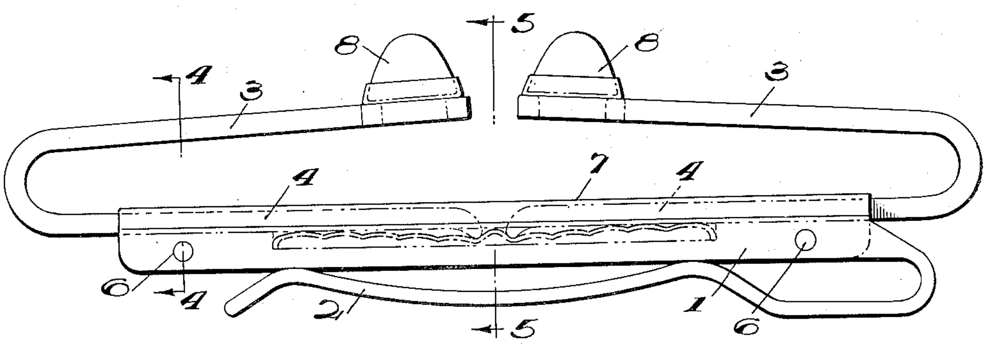
Fig. 2 is a top plan view of the device illustrated in Fig. 1.
Figure 3:
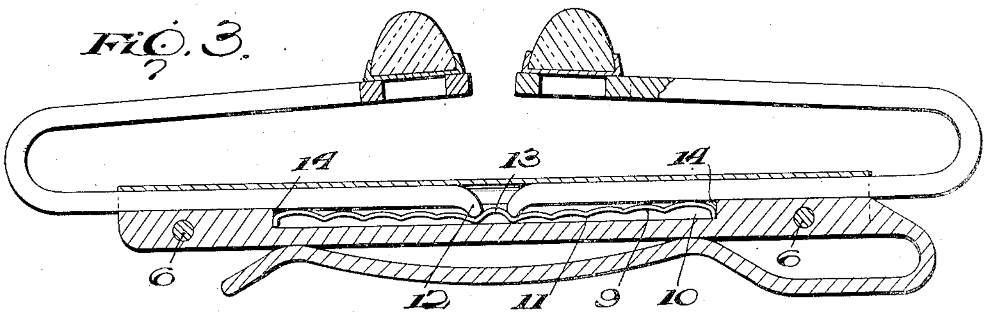
Fig. 3 is a top plan view with parts shown in section.
Figure 4:
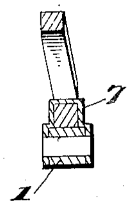
Fig. 4 is a transverse section on the line 4—4 of Fig. 2.
Figure 5:
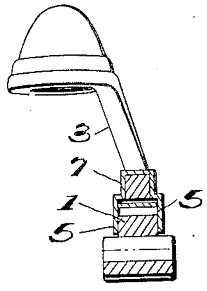
Fig. 5 is a transverse section on the line 5—5 of Fig. 2.
Figure 6:
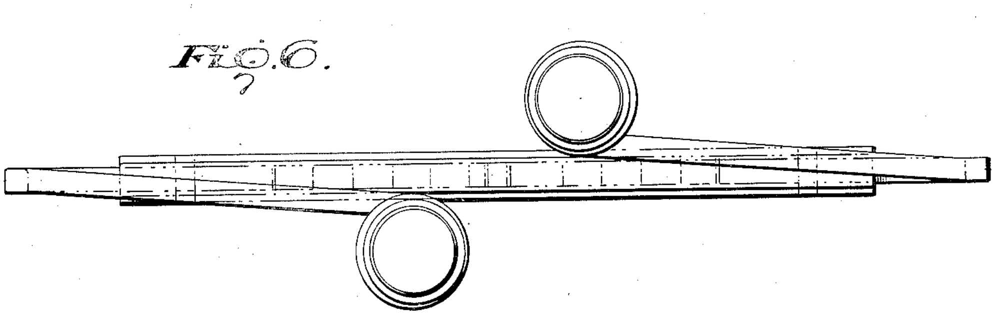
Fig. 6 is a front elevation of a modified form of the device.
Figure 7:
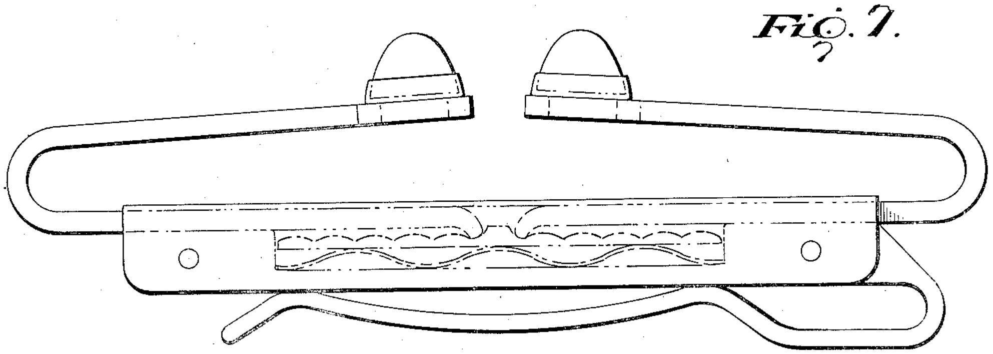
Fig. 7 is a top plan view, with parts shown in section, of the construction illustrated in Fig. 6.
Figure 8:
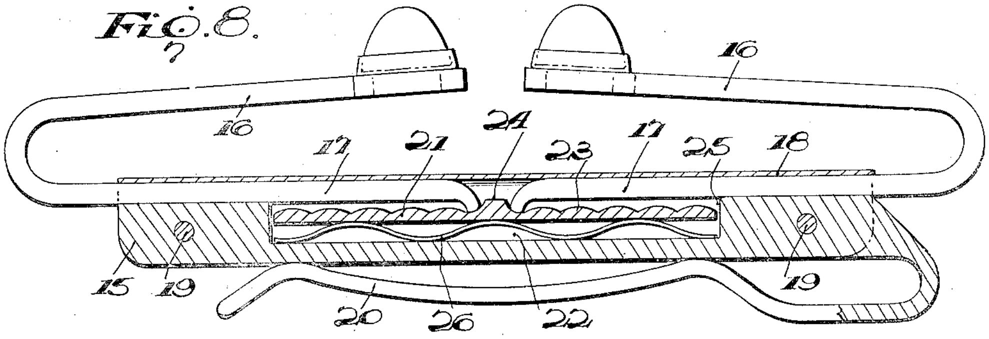
Fig. 8 is a top plan view with parts shown in section.
Figure 9:
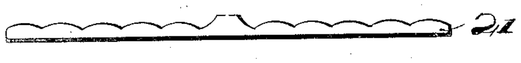
Fig. 9 is a detail view of the serrated floating block of the adjustment means shown in Fig. 8.
Figure 10:
Fig. 10 is a detail view of the supporting spring for the serrated block shown in Fig. 8.
Figure 11:
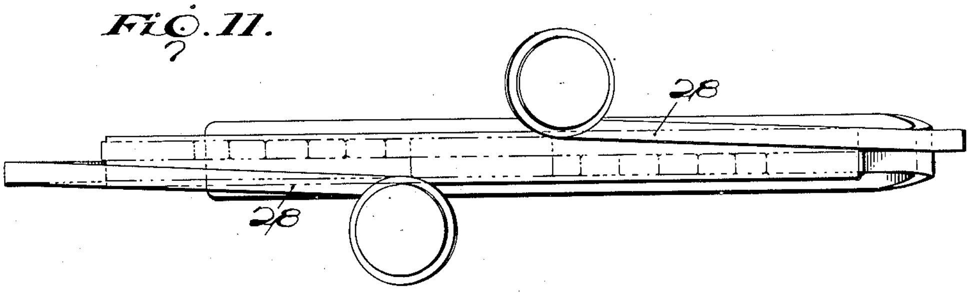
Fig. 11 is a front elevation of another modified form of the device.
Figure 12:
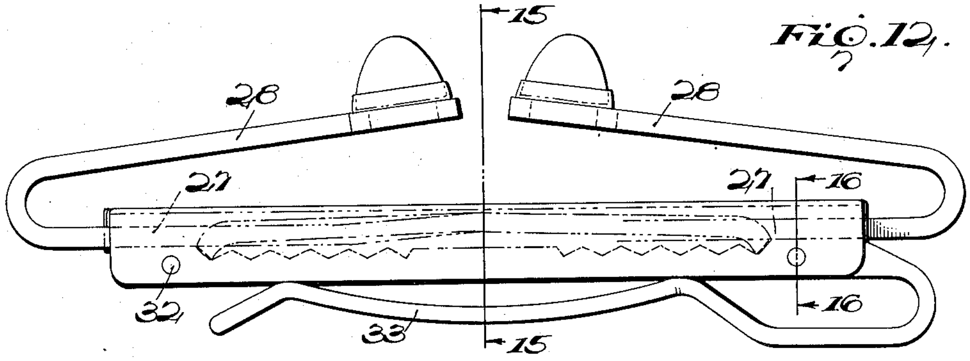
Fig. 12 is a top plan view of the construction shown in Fig. 11.
Figure 13:
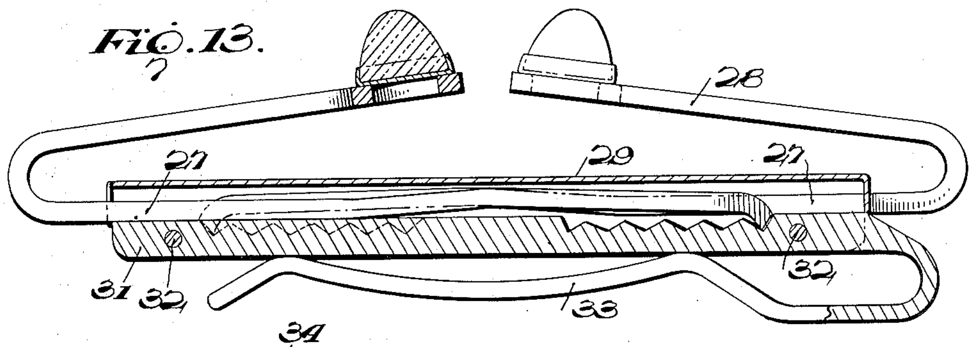
Fig. 13 is a top plan view with parts shown in section.
Figures 14, 15, 16:
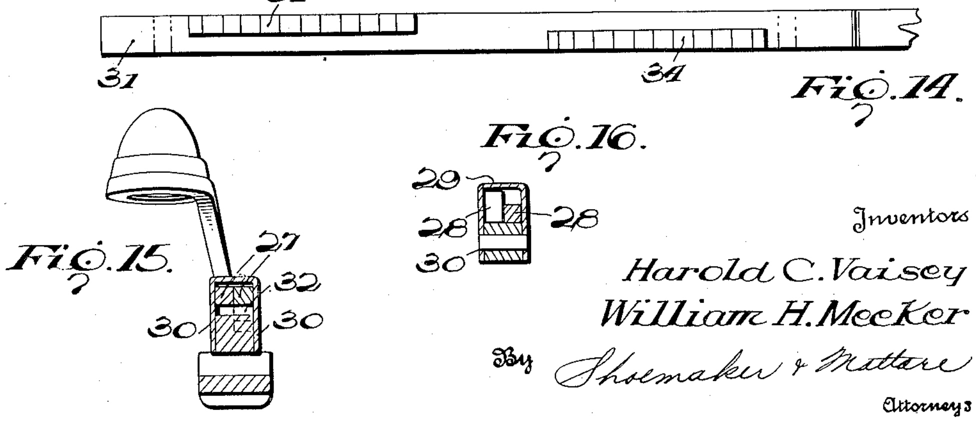
Fig. 14 is a detail front elevation of the inner legs of the tie embracing arms shown in Fig. 13.
Fig. 15 is a transverse section on the line 15—15 of Fig. 12.
Fig. 16 is a transverse section on the line 16—16 of Fig. 12.

While several preferred embodiments of the invention are illustrated in the drawings, it will of course be understood that minor changes and modifications may be made in the particular constructions shown, and the invention may be embodied in other forms as will appeal to those skilled in the art and falling within the scope of the appended claims without departing from the spirit of the invention.

Referring to a detailed description of the particular embodiment of the invention illustrated in Figs. 1 to 5 of the drawings, the construction shown comprises a supporting bar 1 having a clasp 2 on the back thereof adapted to engage over the edge portion of a garment to attach the tie holder in position. Mounted on the supporting bar 1 at the front thereof for adjustment longitudinally are a pair of oppositely disposed inwardly directed arms 3 which are shown of general U-shaped form, each having one leg portion 4 thereof slidably entering a longitudinally extending tubular box like bearing on the front of the supporting bar 1, the other leg portions 3 of the arms being disposed forwardly of and in spaced relation with said box like bearing. The tubular box like bearing is provided by a channel member $5^a$ arranged with its open side facing the front side of the supporting bar 1 and with its side walls 5 fitting over opposite sides of the supporting bar and secured thereto by rivets 6 or similar fastening members, the channel member being of general U-shaped form with a narrowed front portion 7 fitting against the front side of the supporting bar and forming therewith the tubular bearing for the legs of the tie embracing arms 3. The supporting bar 1, as shown, is of relatively small size in cross section and square shaped, and the channel member is constructed of relatively thin sheet metal, the combined structure being of relatively small cross-sectional size and presenting a neat pleasing appearance. The tie embracing arms at their outer ends are shown as having knob-like ornamental settings 8 mounted thereon.

Adjustment means for the tie embracing arms is provided, the same comprising a spring plate member or part 9 seated in a recess 10 in the front of the supporting bar 1, the spring plate being formed with serrations 11 extending transversely thereof, and the leg portions 4 of the tie holding arms are each formed at their inner ends with an inwardly turned reduced portion 12 to cooperate with the serrations of the spring plate member or part, said plate member or part acting as means for positioning and holding the arms in different positions of adjustment as well as exerting spring pressure thereagainst. The spring plate member or part 9 is formed centrally of its ends with a lobe or tooth 13 slightly higher than the serrations 11, the same being adapted to be engaged by the inwardly turned end portions 12 of the arms and serving as stop means to limit the movement of the arms inwardly, the extent of outward movement of the arms being limited by the end walls 14 of the recess 10. As will be understood, the adjusting means allows the arms 3 to be readily adjusted upon application of longitudinal pressure thereto, and when the pressure is removed, the arms are securely maintained in adjusted position.

It will be noted that by the special construction and arrangement of parts hereinbefore described, simple, efficient adjustment means is provided, which allows the arms to be easily adjusted to accommodate ties of various widths and fixedly maintains the same in adjusted position. The particular form of mounting affords a firm, rigid support for the adjustable tie embracing arms. It provides for easy assembly and manufacture, presents a neat, ornamental appearance, and serves as an enclosing casing for the adjustment means.

The modified form of the device illustrated in Figs. 6 to 10, inclusive, is the same as that hereinbefore described and illustrated in Figs. 1 to 5 except that the adjustment means for the tie embracing arms comprises a floating serrated spring pressed block to cooperate with the inner inturned end portions of the arms in place of the serrated spring plate member. In these views, 15 designates the supporting bar, 16 the tie embracing arms, and 17 the inner legs of said arms engaging the tubular bearing 18. 19 are the rivets securing the channel member to the supporting bar 15, and 20 is the clasp on the back of the supporting bar, said clasp as in the construction illustrated in Figs. 1 to 5 being shown as formed integral with the supporting bar. The serrated block, designated 21 is seated in a recess 22 in the front of the supporting bar 15, the same being provided with serrations 23 and with a central lobe or tooth portion 24, which serves as a stop to limit the extent of inward movement of the arms. As in the form of the device hereinbefore described, the extent of outward movement of the arms 16 is limited by the end walls 25 of the recess 22. The block is yieldably supported on a spring 26 positioned in the recess 22 at the under side of the block, said spring being shown as of sinusoidal form having curved portions alternately engaging the block and the bottom face of the recess.

In the modified construction shown in Figs. 11 to 16 of the drawings, the inner leg portions 27 of the adjustable tie embracing arms 28 are arranged in overlapping relation side by side in the tubular box like bearing 29, the latter in this instance being of the same width throughout with its side walls 30 fitting upon the side faces of the supporting bar 31 and secured thereto by rivets 32. On the back of the bar is an attaching clasp 33. In this construction the adjustment means comprises two sets of serrations 34 formed in the front face of the supporting bar at either side of the center of the bar and disposed in staggered relation to cooperate with the inwardly turned outer end portions of the overlapping legs 27 of the arms 28, said leg portions 27, in this construction, being resilient.

Figure 17:
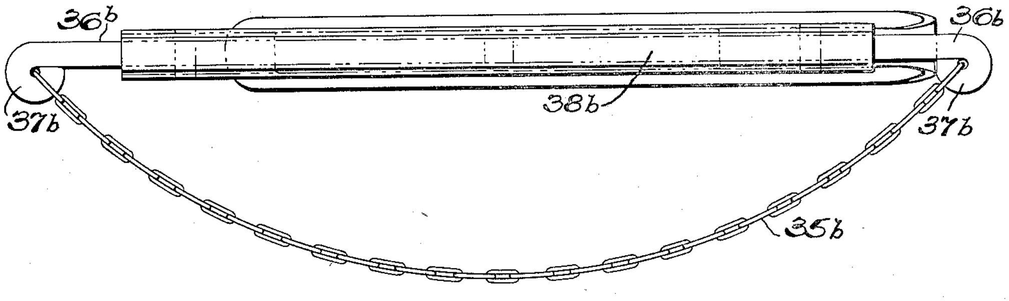
Fig. 17 is a front elevation of another modified form of the device.
Figure 18:
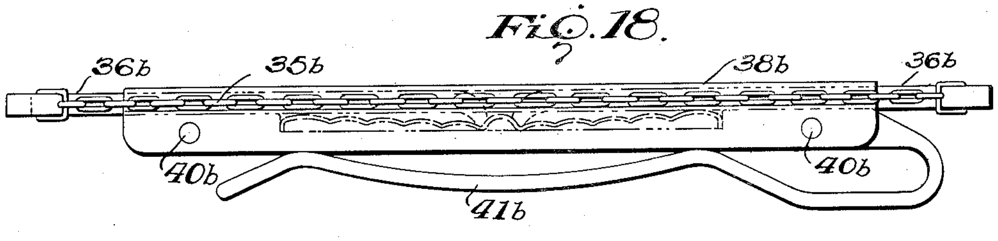
Fig. 18 is a bottom plan view of the construction illustrated in Fig. 17.

The modified construction illustrated in Figs. 17 and 18 has a pair of straight bar members $36^b$ adjustably mounted on the supporting bar and a flexible chain member $35^b$ connected at opposite ends to the outer ends of said adjustable bar members, the latter being provided at their outer ends with enlarged eye portions $37^b$ with which the ends of the flexible chain member $35^b$ are engaged. In this modified construction, the adjustment means for the adjustable bar members $36^b$ is the same in construction as the corresponding parts hereinbefore described and illustrated in Figs. 1 to 5 of the drawings. In these views, $38^b$ designates the tubular bearing for the adjustable bar members $36^b$ fitting over the supporting bar and secured thereto by rivets $40^b$. $41^b$ is a clasp on the back of the supporting bar.

Figures 19, 20:
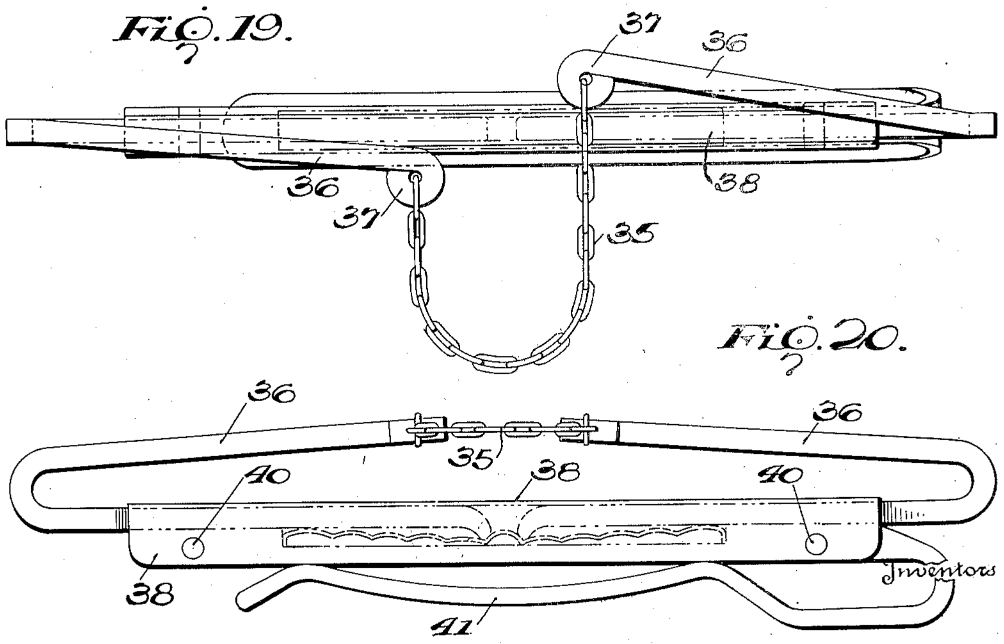
Fig. 19 is a front elevation of another modified form of the device.
Fig. 20 is a bottom plan view of the construction shown in Fig. 19.
Figures 21, 22:
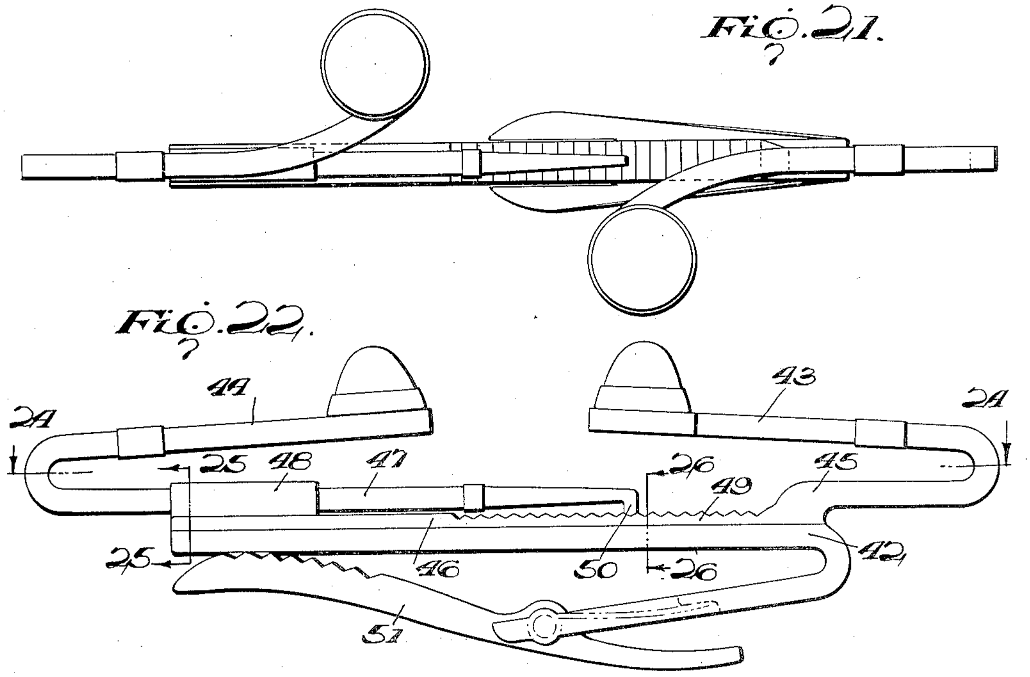
Fig. 21 is a front elevation of another modified form of the device.
Fig. 22 is a top plan view of the construction shown in Fig. 21.
Figure 23:
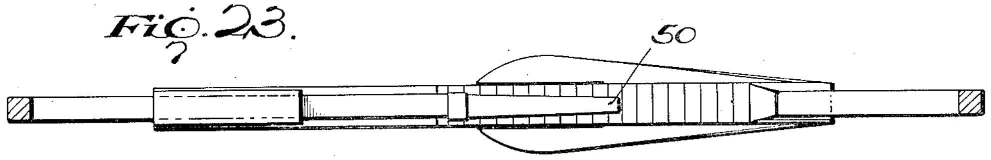
Fig. 23 is a longitudinal section on the line 24—24 of Fig. 22.
Figure 24:
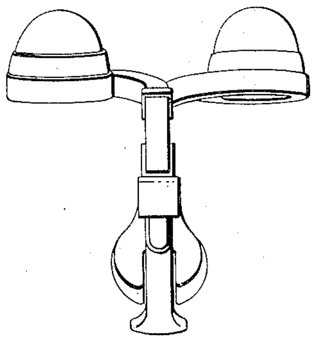
Fig. 24 is an end view of the form of the device illustrated in Fig. 21.
Figure 25:
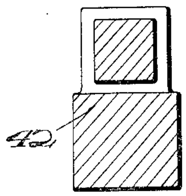
Fig. 25 is a transverse section on the line 25—25 of Fig. 22.
Figure 26:
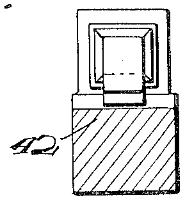
Fig. 26 is a transverse section on the line 26—26 of Fig. 22.
Figure 27:
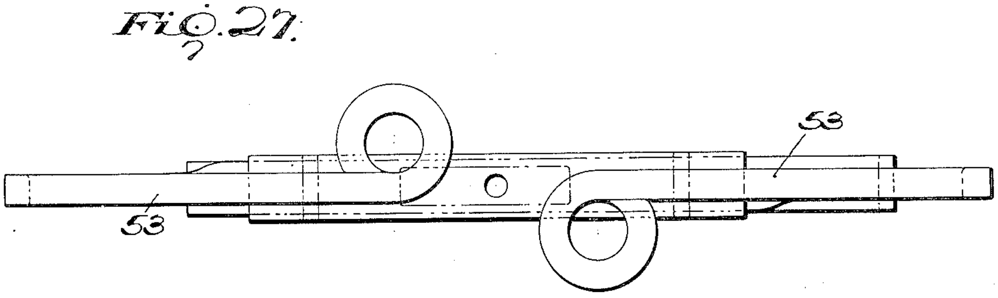
Fig. 27 is a front elevation of another modified form of the device.
Figure 28:
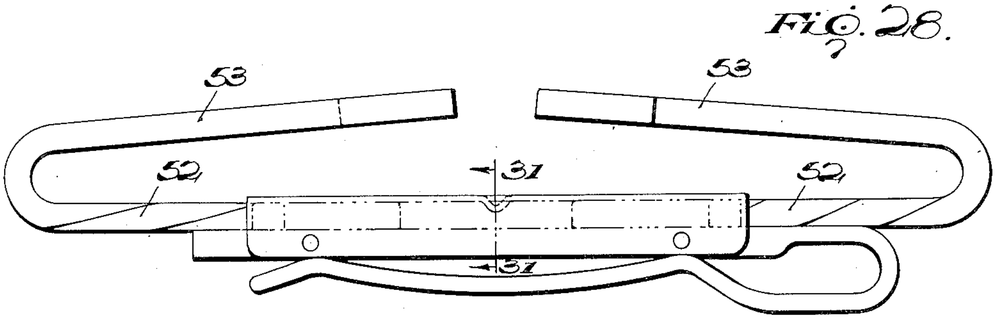
Fig. 28 is a top plan view of the construction illustrated in Fig. 27.

The modified form of the device illustrated in Figs. 19 and 20 is the same as that previously described herein and shown in Figs. 1 to 5 of the drawings except that, in this instance, the tie holder includes a flexible chain member 35 in addition to the tie embracing arms 36, the flexible chain member being suspended from the inner ends of the arms 36, said arms being provided at their inner ends with enlarged eye portions 37 with which the ends of the flexible chain member 35 are engaged. As will be understood, with the modified construction, the amount of the front leg portions of the tie embracing arms 36 overlapping the tie at either side can be varied in length from a mere eye at the extreme outer ends of each of the forward leg portions of the arms to the small chain extending therebetween. In these views, 38 designates the tubular bearing for the tie embracing arms 36 fitting over the supporting bar and secured thereto by rivets 40. 41 designates the clasp on the back of the supporting bar.

Figs. 21 to 26 illustrate a modified form of the device in which only one of the tie embracing arms is adjustable longitudinally of the supporting bar. This modified construction comprises a supporting bar 42 and tie embracing arms 43 and 44, the inner leg portion 45 of the arm 43 being shaped as shown and provided with an extension part 46 fitting upon and suitably secured as by welding to the supporting bar 42. The other arm 44 has its leg portion 47 slidably engaging a tubular bearing 48 on the front of the extension part 46 at one end thereof. Adjustment means for the arm 44 is provided, the same comprising a serrated section 49 formed in the upper face of the extension part 46, the outer end portion of the leg portion 47 being resilient and having an inwardly turned tooth portion 50 to cooperate with the serrated portion 49. 51 designates an attaching clasp on the back of the supporting bar.

Figures 29, 30:
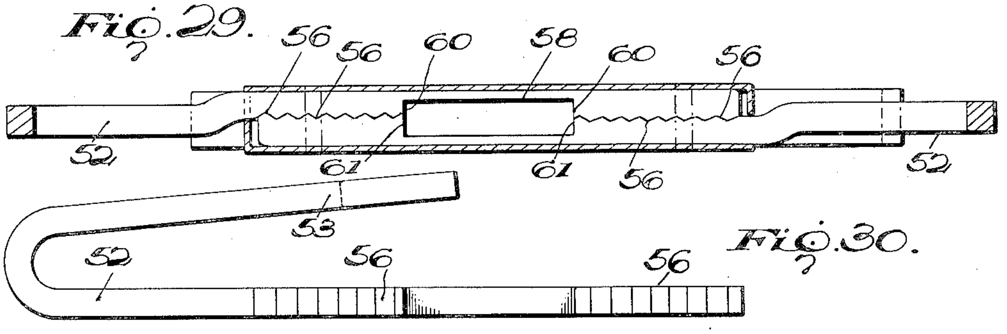
Fig. 29 is a fragmentary front elevation of the construction illustrated in Fig. 27, the front side wall of the tubular bearing for the inner legs of the tie holding arms being broken away.
Fig. 30 is a detail top plan view of one of the tie holding arms shown in Fig. 27.

In the modified construction shown in Figs. 27 to 31, the leg portions 52 of the tie embracing arms 53 are arranged side by side in overlapping relation within the tubular box like bearing that is secured by rivets 54 to the supporting bar 55. In this modified form of the device the adjustment means for the arms 53 comprises series of serrations 56 formed in the inner side faces of the leg portions 52 of the arms 53, each of said leg portions being resilient and the series of serrations in one of the leg portions cooperating with the series of serrations in the other leg portion. The leg portions 52 are provided with recesses 58 in the inner side faces thereof as shown in Fig. 29. Projecting inwardly from the front wall of the tubular bearing centrally of its ends is a portion 59, which is adapted to cooperate with the end walls 60 and 61 of the recesses 58 to limit the extent of inward and outward movement of the arms.

Figure 32:
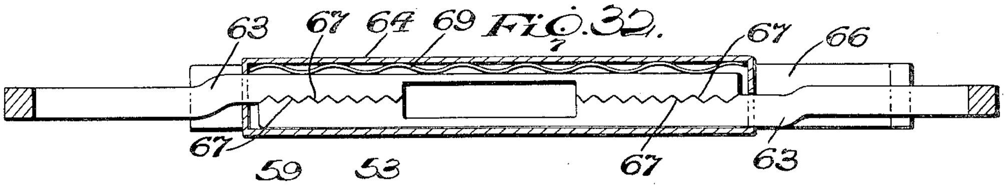
Fig. 32 is a fragmentary front elevation of a modified form of the construction illustrated in Figs. 27 to 31, the front side wall of the tubular bearing for the inner legs of the tie holding arms being broken away.
Figure 31:
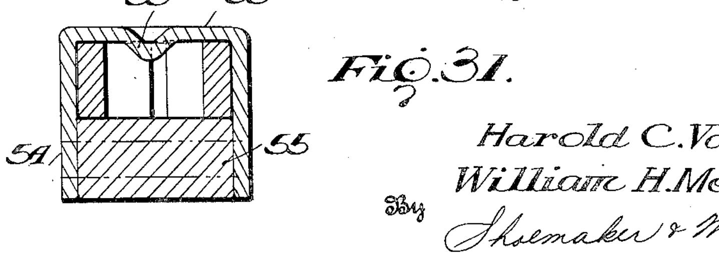
Fig. 31 is a transverse section on the line 31—31 of Fig. 28.

In Fig. 32 of the drawings is shown a modified form of the construction illustrated in Figs. 27 to 31 of the drawings, this modified form being the same as the construction shown in said views except that instead of the inner leg portions of the tie embracing arms having resilient end portions, a spring is provided between the inner leg portions and one side of the tubular box-like bearing for said leg portions to urge the same toward each other. In this view, 63 designates the inner leg portions of the tie embracing arms disposed side by side in overlapping relation within the tubular box-like bearing 64 secured to the supporting bar 66. The adjustment means for the tie embracing arms includes series of serrations 67 formed in each of the opposing inner side faces of the inner leg portions 63 of the arms, the series of serrations in one arm cooperating with the series of serrations in the other arm, and a spring 69 being interposed between one of the inner leg portions 63 and the side of the tubular box-like bearing 64, the spring 69, which is shown as comprising a series of sinusoidal-shaped sections, acting to press the inner leg portions 63 toward each other.

Figs. 33 to 37 show a still further modified form of the device in which only one of the tie embracing arms is adjustable. The tie embracing arms, designated 70 and 71, are of general U-shaped form and mounted in a tubular bearing 72 fitting upon and suitably secured to the front face of a supporting bar 73. On the back of the supporting bar is an attaching clip 74. The leg portion 75 of the arm 70 has an enlarged outer end part 76 fixedly secured within the tubular bearing 72. The leg portion 77 of the other tie embracing arm 71 slidably engages the tubular bearing 72 and has at its outer end a resilient curved part 78 terminating in a flat portion 79, said curved part 78 engaging the back wall 80 of the tubular bearing 72 and the flat terminal portion 79 engaging the front wall 81 of the tubular bearing, said parts allowing ready adjustment of the arm 71 but bearing against the opposing walls 80 and 81 of the tubular bearing with sufficient pressure to fixedly maintain said arm in different positions of adjustment along the supporting bar 73.

What we claim is:

1. A necktie holder including an elongated solid rigid supporting bar, a substantially U-shaped channel element on the bar at the front side thereof substantially coextensive in length therewith, the sides of said channel element fitting on the upper and lower faces of the supporting bar and being fixedly secured thereto, the channel element forming with the front face of the supporting bar a rigid tubular bearing, said bar having a recess in the front side thereof intermediate its ends, a pair of oppositely disposed arms each having a portion thereof extending into the tubular bearing from one end thereof and supported thereby, one of said arms being supported for longitudinal sliding adjustment relative to the tubular bearing and to the other of said arms, said adjustable arm having a laterally and inwardly projecting portion on the inner end thereof, and means for holding said adjustable arm in different positions of longitudinal adjustment, said means being completely enclosed within the tubular bearing and including a serrated member mounted in the recess in the supporting bar and carried thereby, the laterally and inwardly projecting portion on the inner end of said adjustable arm engaging said serrated member and constituting therewith a holding and adjustment member, one of said members being resiliently urged laterally toward the other so that said holding and adjusting member is maintained in operative engagement with the serrated member to resiliently and adjustably hold said adjustable arm in any selected position along the supporting bar within the channel element and allowing for longitudinal adjustment relative to the channel element and the supporting bar.

2. A necktie holder as defined in claim 1 and in which the portion of each of the arms that extends into the tubular bearing is slidably supported thereby for longitudinal adjustment relative thereto and to each other, and each of said portions of the arms has a laterally and inwardly projecting inner end portion engaging the serrated member.

3. A necktie holder as defined in claim 2 and wherein the serrated member has a laterally and outwardly projecting stop portion centrally of its ends for engagement by the laterally and inwardly projecting end portions of the arms, to limit the inward longitudinal adjustment of said arms relative to the supporting bar.

4. A necktie holder as defined in claim 3 and wherein the recess has similar spaced outer end walls, and which end walls serve to limit the longitudinal adjustment of the arms outwardly relative to the supporting bar.

5. A necktie holder as defined in claim 1 and wherein the serrated member is in the form of a laterally resilient serrated plate.

6. A necktie holder as defined in claim 1 and wherein the serrated member is in the form of a block having one side face serrated, the block being mounted in the recess in the supporting bar with its serrated side face disposed outwardly for movement laterally of the supporting bar, and there being spring means within said recess engaging the inner side of the block and yieldably supporting the same.

7. A necktie holder as defined in claim 1 and wherein the serrated member is in the form of a block having one side face serrated, the block being mounted in the recess in the supporting bar with its serrated side face disposed outwardly for movement laterally of the supporting bar, and there being within the recess at the rear side of the block an elongated spring of sinusoidal form having curved portions alternately engaging the block and the bottom wall of said recess.

8. A necktie holder including an elongated solid rigid supporting bar, a substantially U-shaped channel element on the bar at the front side thereof substantially coextensive in length therewith, the sides of said channel element fitting on the upper and lower faces of the supporting bar and being fixedly secured thereto, the channel element forming with the front face of the supporting bar a rigid tubular bearing, said bar having a recess in the front side thereof intermediate its ends, a pair of oppositely disposed arms each having a portion thereof extending into the tubular bearing from one end thereof and supported thereby, one of said arms being supported for longitudinal sliding adjustment relative to the tubular bearing and to the other of said arms, said adjustable arm having a laterally and inwardly projecting rear portion on the inner end thereof, and means for holding said adjustable arm in different positions of longitudinal adjustment, said means being completely enclosed within the tubular bearing and including a resilient structure mounted in the recess in the supporting bar and carried thereby, said resilient structure being rearwardly yieldable, the laterally and inwardly projecting portion on the inner end of said adjustable arm engaging said resilient structure and constituting therewith a holding and adjustment member, the resilient structure acting to maintain said holding and adjusting member in operative engagement therewith to resiliently and adjustably hold said adjustable arm in any selected position along the supporting bar within the channel element and allowing for longitudinal adjustment of said arm relative to the channel element and the supporting bar.

HAROLD C. VAISEY.
WILLIAM H. MEEKER.

REFERENCES CITED

The following references are of record in the file of this patent:

UNITED STATES PATENTS

| Number | Name | Date |
|---|---|---|
| 318,369 | Gottstein | May 19, 1885 |
| 1,619,390 | Wolf | Mar. 1, 1927 |
| 1,635,791 | Jagemann | July 12, 1927 |
| 1,753,832 | McDonald | Apr. 8, 1930 |
| 1,823,043 | Heugas | Sept. 15, 1931 |
| 1,990,467 | Blustein | Feb. 12, 1935 |
| 2,001,261 | Manaster | May 14, 1935 |
| 2,030,997 | Madison | Feb. 18, 1936 |
| 2,060,040 | Cobb | Nov. 10, 1936 |
| 2,082,747 | Anderson | June 1, 1937 |
| 2,150,020 | Carlson | Mar. 7, 1939 |